United States Patent [19]

Burton

[11] Patent Number: 5,116,897
[45] Date of Patent: May 26, 1992

[54] ANTISTATIC COMPOSITION

[75] Inventor: Wendel L. Burton, Arden, N.C.

[73] Assignee: BASF Corporation, Parsippany, N.J.

[21] Appl. No.: 544,305

[22] Filed: Jun. 27, 1990

[51] Int. Cl.$^5$ .................. C08J 5/10; C08L 33/24
[52] U.S. Cl. ................. 524/243; 524/239; 524/244; 524/245; 524/913; 560/90; 560/91; 560/198; 560/199
[58] Field of Search .......... 524/239, 913, 243, 244, 524/245; 560/90, 91, 198, 199

[56]  References Cited
U.S. PATENT DOCUMENTS

| | | | |
|---|---|---|---|
| 2,979,528 | 4/1961 | Lundsted et al. | 260/584 |
| 3,755,249 | 8/1973 | Fujita et al. | 260/45.75 |
| 3,978,098 | 8/1976 | Siclari et al. | 260/404 |
| 4,080,315 | 3/1978 | Login | 526/3 |
| 4,108,922 | 8/1978 | Crescentini et al. | 528/407 |

FOREIGN PATENT DOCUMENTS 0091141  5/1984  Japan ................. 524/913

OTHER PUBLICATIONS

Brown and Pailthorpe, "Antistatic Fibres and Finishes", *Rev. Prog. Coloration*, vol. 16. pp. 9–13.

Sello and Stevens, "Antistatic Treatments", *Handbook of Fibers Science & Technology*, vol. II, pp. 291–313.

Zhao, Kimura, Taniguchi, Sano and Muroaoka, "Poly(oxyethylene) Diglycolic Acid: A Novel Blending Antistatic Agent for Polyamide Fibres", *Die Angewandte Makromolekulare Chemie 132*, 1985, pp. 169–185.

*Primary Examiner*—Paul R. Michl
*Assistant Examiner*—U. K. Rajguru

[57]  ABSTRACT

Described is a composition imparting antistatic properties to polyamide materials and of the general formula:

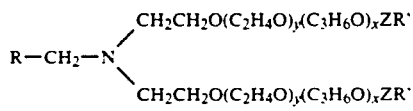

wherein R is a $C_{1-9}$ alkyl group or hydrogen, Z is a difunctional chain modifier group, R' is a $C_{1-4}$ alkyl group or hydrogen and x and y are between about 10 and about 50.

16 Claims, No Drawings

ANTISTATIC COMPOSITION

Background of the Invention

This invention relates generally to antistatic compositions. More specifically this invention relates to antistatic compositions exhibiting excellent durability and activity when dispersed in polyamide materials.

The discovery of practical methods to control static electricity has been the fuel for extensive research in many industries. In particular, in the textile industry to which the present invention is directed although not limited, there exists a great deal of written material exploring the causes, effects and solutions to static electricity problems. Industry literature reviews describe various antistatic chemical compounds which have been developed for improving antistatic properties of fibers. Among these are: D. M. Brown and M. T. Pailthorpe, "Antistatic Fibres and Finishes", *Rev. Prog. Coloration*, Vol 16, pp. 9–13 and Stephen B. Sello and Catherine V. Stevens, "Antistatic Treatments", *Handbook of Fibers Science & Technology*, Vol II, pp. 291–313. Two primary methods of providing antistatic agents are by coating the fiber and by internally incorporating the agent into the polymer, often in the melt.

It is known from the teachings of U.S. Pat. No. 4,080,315 to Login that incorporating antistatic agents in the polymeric material is a preferred method of producing antistatic effects. Particularly, it is known that a polyamide fiber may be made static resistant by incorporating an antistatic agent into the polymer melt prior to spinning. Fibers extruded from a melt of this type are believed to contain the additive in the form of fibrils aligned with and dispersed throughout the fiber.

A particular class of internal antistatic compounding agents which has proven useful is oxyalkylenes. For example, the use of polyoxyalkylene diglycolic acid has been described to impart antistatic properties to polyamide fibers. Yao M. Zhao, Yoshiharu Kimura, Isoji Taniguchi, Yoshiyuki Sano, and Youichiro Muroaoka, "Poly(oxyethylene) Diglycolic Acid: A Novel Blending Antistatic Agent for Polyamide Fibres", *Die Angewandte Makromolekulare Chemie* 132, 1985, pp 169–185.

Tetrol-type compounds are a further example of oxyalkylene containing antistatic compounds. Such extended chain tetrols are described in U.S. Pat. No. 2,979,528 to Lundsted.

U.S. Pat. No. 4,108,922 to Crescentini et al. describes an antistatic composition having a molecular weight of at least 1500. The composition is a predominantly branched chain-extended tetrol compound resulting from the reaction of a tetrol and a diepoxide or a divalent carbonyl-yielding compound.

U.S. Pat. No. 3,978,098 to Siclari et al. defines a polyoxylated aminoacid antistatic agent. This agent is amphoteric, but more recent studies suggest that ionic character reduces durability of antistatic agents.

U.S. Pat. No. 3,755,249 to Fujita et al. describes a polyoxylated antistatic agent comprising: (A) a polyalkylene oxide-added secondary alkylamine and (B) a polyalkylene oxide-added tertiary alkylamine. The tertiary alkylamine is of the general formula:

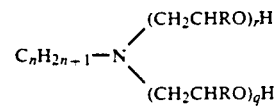

where n is not less than 10, (q+r) is preferably not less than 15 and R is hydrogen or a methyl radical. According to the patent, if either one of the compounds is omitted from a formulation, the object of that invention can never be achieved.

One of the problems faced in developing a suitable effective internal antistatic additive for textiles relates to durability. Oftentimes an additive incorporated into a polymeric material will be quite effective initially but after a few washings become nearly completely ineffective. This is usually the result of leaching of the antistatic material into the wash water to the degree where it is no longer present in the fiber in an effective amount.

Furthermore, it has been found that, for efficacy, some internal antistatics must be incorporated in such high amounts relative to the base polymer that secondary characteristics of the final product are adversely affected. In addition, as larger amounts of antistatics are incorporated into the polymer melt, processing parameters, and sometimes equipment, must be modified to deal with the different performance of the antistat/polymer blend.

Despite the volume of effort directed toward developing an effective antistatic having good durability as well as activity in low concentrations, such an antistatic agent has to the present eluded discovery.

SUMMARY OF THE INVENTION

Accordingly, the present invention is a composition which imparts antistatic properties to polyamide materials and is of the general formula:

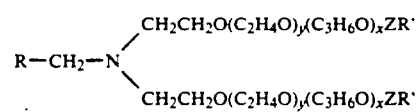

wherein R is a $C_{1-9}$ alkyl group or hydrogen, Z is a difunctional chain modifier group, R' is a $C_{1-4}$ alkyl group or hydrogen and x and y are between about 10 and about 50.

It is an object of the present invention to provide an improved antistatic material.

Additional objects and advantages of the present invention will be apparent to one ordinarily skilled in the art after reading the following description.

DETAILED DESCRIPTION OF THE PREFERRED EMBODIMENTS

For the purposes of promoting an understanding of the principles of the invention, reference will now be made to specific embodiments of the invention and specific language which will be used to describe the same. It will nevertheless be understood that no limitation of the scope of the invention is thereby intended, such alterations and further modifications, and such further applications of the principles of the invention as discussed are contemplated as would normally occur to one skilled in the art to which the invention relates.

In the following discussion, weight percentages are given as percentages of the total weight unless noted otherwise.

According to the present invention, it has been surprisingly discovered that textiles impregnated with a monoamine of the general formula:

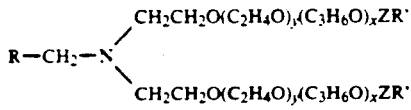

have improved antistatic characteristics as well as secondary characteristics. This compound is also durable to washing and wear. In the above general formula R is a $C_{1-9}$, preferably $C_{1-5}$, alkyl group or hydrogen; Z is a difunctional chain modifier; R' is an alkyl group or hydrogen; and x and y are between about 10 and about 50, but preferably between about 15 to about 40.

The novel antistatic agent of the invention is a linear polyester preferably prepared via the base-catalyzed transesterification of dimethyl azelate with a N-methyldiethanol amine-initiated ethylene oxide/propylene oxide block polymer. The N-methyldiethanolamine block polymer is preferably prepared by reacting methyldiethanolamine (MDEA) with ethylene oxide followed by propylene oxide and then chain modification.

The optimum length of propylene oxide and ethylene oxide chains in general has been optimized and the optimum length is known from the literature for antistatic activity but not for washfastness. For activity, the preferable chain length is known to be approximately 20 units per ethylene oxide block. It is, of course, understood that the optimum chain length is in fact an average chain length. The regulation of the chain to the desired length is easily accomplished by one ordinarily skilled in the art by adding proper molar equivalents in a stepwise manner.

Chain modifiers useful with the present invention are known to those skilled in the art. By way of illustration, the preferred chain modifiers are difunctional. The useful difunctional chain modifiers preferably have acidic or nearly analogously reactive functionality. Preferred chain modifiers are dibasic acids having less than 18 carbon atoms and derivatives thereof. Exemplary modifiers are azelaic acid and alkylazelates.

The oxyalkylene chains are preferably end-capped. The cap may be a short chain alkyl or alkyl carbonyl groups, yielding ether or ester derivatives, respectively. Examples of suitable capping groups are alkyl radicals of about $C_1-C_4$, with methyl caps, being presently most preferred. Alternatively, the chains might not be capped.

The antistatic agent of the present invention may be used with polyamides, such as nylon 6, nylon 12, nylon 6/T and nylon 6,6, mixtures and copolymers thereof and polyesters. The presently most preferred use of the antistatic agent is with nylon tricot yarn. Thus, the following discussion is directed, for purposes of illustration only, to polyamides intended for extrusion. This use of polyamides to illustrate the present invention is not intended to limit the invention's scope. The use of the agent with other polymers, for example, polyester is contemplated, as is the use in other molding operations, for example, injection molding.

As has been noted, the present antistatic agents are designed for use as internal additives in polymer processing. Thus, the antistatic agent should be mixed with the polyamide. In the case of melt spinning, the agent should be mixed thoroughly with molten polyamide prior to extrusion. Advantageously but not essentially, the antistatic is blended with a portion of the polyamide to form a concentrate which is then diluted with neat polyamide to achieve the desired final concentration. For example, the antistatic may be supplied as a concentrate in nylon 6 when intended for compounding with nylon 6 based polymers. One useful concentrate level is about 15% antistatic per total weight of antistatic/nylon 6 mixture.

In the final composition for processing, the antistatic agent may be present from about 0.5% to about 12% by weight, more preferably from about 2% to about 6% and, most preferably from about 2% to about 4%.

Nylon or other polymeric material having the antistatic agent of the present invention formulated therewith is conveniently processed on conventional two-step or one-step processing equipment for the corresponding polymer. In some circumstances, it may be desirable to modify certain of the processing parameters depending on the desired results. Some modifications may be needed for large proportions of antistatic agent, for example, the mode of addition can be changed. For nylon processing the spinneret preferably has holes of larger diameter than is typical for nylon spinning. It has been discovered that in the practice of this invention increasing the spinneret hole diameter over normal dimensions increases antistatic activity, thereby reducing significantly the optimum amount necessary to achieve acceptable antistatic activities. Furthermore, round holes are presently preferable to trilobal. Of course, the preferred spinneret hole size and shape will depend on processing conditions or marketing requirements.

Drawing of the blended nylon 6 (or other polymer) may be accomplished using conventional drawing procedures. For example, the process can be a one-step spin-draw or a two-step spin-lag-draw. The draw ratio is designed to be as high as possible to yield acceptable end physical properties. Higher tenacity is preferable since it seems to enhance dye and antistatic washfastness.

The final yarn is preferably 20 to 70 denier and commonly has 12 to 28 filaments per yarn. The final product can advantageously be treated like any other polymer of the kind without the additive. In the case of nylon tricot it may be, for example, warped, knitted, dyed and cut for garments.

The secondary attributes of the tricot made with the antistatic of the present invention are not adversely affected by the antistatic agent. For example, the hand, whiteness and dye washfastness of the fabric were not noticeably reduced by the addition of the antistatic agent and in some cases were noticeably improved. One reason for this improved behavior is that less agent is required to achieve acceptable antistatic activity. Moreover, the antistatic agent exhibited increased durability to washing and enhanced washfastness of the dye when compared to other compounds with which antistatic activity has been associated.

Although not desiring to be limited by theoretical explanations, it is believed that the physico-chemical properties of the antistatic agent of the present invention account for its improved durability and activity. First, the agent is nearly linear since the size of the primary and secondary oxyalkylene groups far overshadows the tertiary alkyl group. Because it is nearly linear, the intimate blending of the nylon and the agent is believed to be free from the sterochemical hindrance present in the case of more bulky antistatic agents. The present antistatic agent fits better in the nylon. It is believed that since it is better integrated within the nylon material itself, it is less susceptible to the factors responsible for leaching and is oriented to enhance charge dissipation.

Second, the antistatic of the present invention is less viscous than many of its predecessors. The viscosity of the agent is typically about 2500 cps more or less although it may be much higher in some cases. It is believed that its lower viscosity encourages the antistatic to migrate to the extrudate surface during extrusion, thereby enhancing the surface properties.

Further, the blend of ethylene and propylene oxides can be optimized for activity, compatibility and solubility trends. As noted, the preferred length of the ethylene oxide block is between about 20 and about 50, while the preferred length of the propylene block is between about 10 and about 50. One explanation of the improved washfastness observed with the present invention is that the propylene oxide promotes insolubility of the antistatic agent while the ethylene oxide promotes antistatic behavior. It has been observed that the antistatic behavior of fabrics containing the present invention actually improves with washing.

The invention will now be further described by reference to the following detailed examples. The examples are set forth by way of illustration and are not intended to be limiting in scope.

In the following examples, electrostatic cling was measured according to AATCC test method 115-1965. The starting materials, i.e., N-methyldiethanolamine, potassium hydroxide, ethylene oxide, propylene oxide, dimethyl azelate, phosphoric acid, etc., are readily available from commercial sources. Alternatively, these materials may be prepared according to procedures which are readily available in the literature.

EXAMPLE 1

Preparation of a Linear Polyester Antistatic Agent

Step 1: Preparation of mdea base

To a prepared, nitrogen padded two gallon autoclave, 674 g of N-methyldiethanolamine and 48.3 g 90% potassium hydroxide are charged. The autoclave is sealed, purged and pressure checked. The mixture is heated to 90° C. and stirred for one hour. While at 90° C., the autoclave is evacuated to 10-15 mm Hg and stripped for 2 hours until the water content is less than 0.1%. The vessel is backfilled with nitrogen and heated to 135° C. The nitrogen pressure is increased to 34 psig and 4526 g ethylene oxide is added at a rate of about 800 g/hr. After all of the ethylene oxide is added the reaction is allowed to continue for 1.5 to 3 hours. The autoclave is then cooled to 70° C., vented and discharged.

Step 2:

2380 g of the base prepared in step 1 is charged to a prepared, nitrogen-padded five gallon autoclave. While heating to 135° C., the vessel is evacuated to <10 mm Hg. The material is stripped for at least 30 minutes until the water content is below 0.05%. The vacuum is relieved with nitrogen and the pressure is taken to 34 psig. At 135° C., 6630 g ethylene oxide is added at a rate of about 1400 g/hr. After the entire amount has been added, the mixture is allowed to react at constant pressure for 1.5 to 3 hours and then cooled 115° C. with slow venting. Propylene oxide (7370) grams is added at a rate of about 1000 g/hr and the reaction proceeds for no more than about 5 hours. The vessel is cooled to 80° C., vented and discharged.

Step 3:

The mixture prepared in step 2 (12900 g) is charged to a prepared, nitrogenpadded five gallon autoclave while molten (at 90° C.) along with 565 g dimethyl azelate. The mixture is heated with stirring to 140° C. The vessel is then evacuated to about 100 mm Hg and kept at that pressure for about 15 minutes. Further evacuation to 50 mm Hg takes place and again the mixture is held for 15 minutes. This manner of stepwise evacuation continue until a pressure of 10 mm Hg is achieved. Stripping at 140° C. takes place until the viscosity reaches 1900–3300 cSt (kinematic, 100° C.).

The vessel is cooled to 95° C., charged with 21.3 g 85% phosphoric acid and sealed. While heating to 110° C., evacuation takes place slowly to avoid bumping. Stripping takes place for about 1.5 hours at 110° C., followed by vacuum relief and cooling.

The resulting product is identified as a linear polyester of the present general formula.

EXAMPLE 2

Preparation of Nylon Tricot Yarn

Nylon 6 having a relative viscosity of 2.5 is extruded at 17.0 grams/minute/35 hole spinneret via a three zone one-inch extruder (230, 260, 260° C. per zone, respectively), through 21 one-inch 4×4 ISG's and a spin pump at 265° C. and finally, through a 59 mm screen pack and spinneret. The antistatic agent prepared according to Example 1 above is heated in a stainless steel melt tank under slight nitrogen pressure to above its melting point and pumped into the extruder exit port before the ISG's using a ⅛B Zenith pump. The addition rate is sufficient to result in afiber having about 4.5% additive. The additive addition rate is controlled by adjusting the rpm of the Zenith pump. The extruder pressure is 1000–2000 psi on the chip and 200–280 psi on the additive. A finish is applied by kiss roll to the filament bundles after air quenching, the yarn being taken up on a 959 Leesona winder. The speed of the winder is set to deliver a spun denier of approximately 11.6 grams per filament. Drawtwisting is carried out nominally at a draw ratio of 3.43 but is varied to the desired requirements of tensile properties.

EXAMPLE 3

Comparative Example—Activity

Fabric samples are prepared and various properties of each evaluated as set forth in below. Table 1 sets forth some general properties of the additive containing fibers, as well as the antistatic activity measured by decling time. The fibers are made according to uniform standard procedures and are drawn at a draw ratio of 3.43. The comparative samples A through G represent nylon 6 formulated with tetrol type antistatic agents of the general formula:

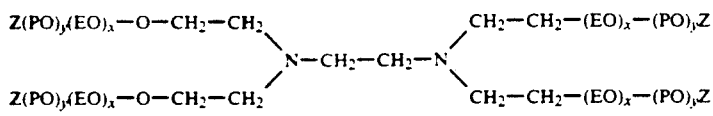

Samples H and I are samples representative of the present invention. Sample J is similar in structure to the present invention, but the length of the R substituent is somewhat longer. Sample K is a control made from nylon 6 fiber without any antistatic additive. Abbreviations used in the following tables are as follows:
AS = antistatic agent
EO = ethylene oxide
PO = propylene glycol
Vis = viscosity (cps)
Den = denier (g/den)
E = % elongation
BS = breaking strength (gms)
DC(S) = decling time in min. of scoured fabric
DC(D) = decling time in min. of fabric dyed Celanthrene Fast Blue CR.

forth below. Samples A through G were evaluated as well. Results are set forth in Table 2.

Home Laundry Wash Procedure

To evaluate the durability of antistatic fabrics, samples are subjected to a wash procedure before the static properties are measured. The samples are washed in a Sears Kenmore 600 home laundry washer with the following machine settings:
water level: low
water temperature: warm −49° C.
machine setting: delicate cycle
second rinse: off Concentration of Tide in the wash is 0.36 g/liter (15 grams in 11 gallons water). Liquid-to cloth ratio is 30 to 1. Woven cotton sheeting pieces approximately 0.8 × 0.8

TABLE 1

| | Additive | % AS | % EO | Vis | Den | % E | BS | DC (S) | DC (D) |
|---|---|---|---|---|---|---|---|---|---|
| A. | Tetrol modified with terephthalate | 5 | 55 | 27,500 | 122 | 54 | 473 | 5.4 | >15 |
| | | 10 | 55 | 27,500 | 116 | 48 | 433 | 0.35 | 7.0 |
| B. | Tetrol modified with terephthalate | 5 | 40 | 22,000 | 126 | 54 | 511 | >15 | >15 |
| | | 10 | 40 | 22,000 | 124 | 52 | 486 | 4.5 | 9.0 |
| C. | Tetrol modified with terephthalate (low viscosity) | 5 | 55 | 4,000 | 123 | 48 | 488 | 11 | ≧12 |
| | | 10 | 55 | 4,000 | 124 | 42 | 470 | 7.2 | ≧11 |
| D. | Tetrol modified with fatty acid | 5 | 55 | 27,500 | 122 | 53 | 470 | 2.5 | 14 |
| | | 10 | 55 | 27,500 | 120 | 59 | 493 | 0.35 | 3.7 |
| E. | Tetrol with 1.0% 5-isophthalate sodium salt | 5 | 70 | 37,000 | 121 | 35 | 402 | 1.0 | 5.8 |
| | | 10 | 70 | 37,000 | 121 | 46 | 420 | 0.33 | 0.52 |
| F. | Tetrol with 1.1% 5-isophthalate sodium salt | 5 | 55 | 28,000 | — | 44 | 440 | 2.0 | 4.2 |
| | | 10 | 55 | 28,000 | — | 50 | 450 | 0.48 | 1.6 |
| G. | Tetrol with 1.0% 5-isophthalate sodium salt (low viscosity) | 5 | 55 | 12,000 | 123 | 51 | 477 | >15 | >15 |
| | | 10 | 55 | 12,000 | 123 | 46 | 430 | 1.1 | 1.2 |
| H. | Invention R = H Z = azelaic acid | 3 | 55 | 2,000 | — | — | — | 11 | >15 |
| | | 5 | 55 | 2,000 | — | — | — | 2.5 | 5.0 |
| | | 7.5 | 55 | 2,000 | — | — | — | .34 | 3.2 |
| I. | Invention R = H Z = 5-isophthalate sodium salt | 5 | 55 | 22,500 | 118 | 39 | 503 | .88 | 1.1 |
| | | 7.5 | 55 | 22,500 | 118 | 46 | 520 | .22 | .56 |
| J. | Polyester similar to invention formula R = C₁₇H₃₅ (stearyl) Z = azelaic acid | 5 | 55 | 2,400 | 118 | 51 | 409 | >10 | >6 |
| | | 7.5 | 55 | 2,400 | 121 | 42 | 449 | 5.3 | >6 |
| K. | Control (no antistat) | 0 | 0 | — | 123 | 50 | 473 | >15 | >15 |

EXAMPLE 4

Comparative Washfastness

Antistatic fabrics from various sources are obtained and evaluated for washfastness of the antistatic agent according to the home laundry wash procedures set meter are used to bring the total weight to approximately 1400 grams. The complete program of the washing machine is as follows for the delicate cycle wash used:

a) fill with water at 49° C. (11 gallons)

b) wash 8 min. with "slow" speed of agitator (48 cycles per min.)
c) drain
d) centrifuge 2 min. during which time four 5-second spraying with fresh water are applied at 49° C.
e) fill with fresh water at 49° C. (11 gallons), soak 2 min. after filling.
f) agitate 2 min. at slow speed
g) drain
h) centrifuge 4 min.

Rinsing is as described by steps d), e) and f) above. The water contains 8-12 ppm hardness and a trace of chlorine (less than 0.5 ppm); pH is 7.3-7.5. Only after completing the required number of wash cycles, the samples are removed and dried in a Kenmore electric dryer, Model 110, for approximately 20 min. at a temperature of 110°-130° F. When creased or wrinkled, the specimens are pressed lightly on the wale side using a warm (approximately 60°-70° C.) iron.

with Celanthrene Blue. Samples M through P are not included since the polymer therein is nylon 6,6 and a suitable comparison to nylon 6 is, therefore, not possible. The method used to measure Delta E is substantially as described in Billmeyer, F. & Saltzman, M., *Principles of Color Technology, 2nd Edition*. Washing procedure is as described in Example 4 above. The results are set forth in Table 3 below.

TABLE 3

| Sample | % AS | Delta E |
|---|---|---|
| A. | 7 | 9.0 |
|    | 10 | 11.2 |
| B. | 5 | 5.2 |
|    | 7.5 | 8.2 |
|    | 10 | 11.7 |
| C. | 5 | 7.1 |
|    | 10 | 11.4 |
| D. | 5 | 7.7 |
|    | 10 | 12.2 |
| G. | 5 | 6.0 |
| H. | 10 | 12.8 |
|    | 3 | 3.8 |
|    | 5 | 4.7 |
|    | 7.5 | 6.3 |
| K. | 0 | 4.2 |
| R. | — | ≈5 |

TABLE 2

| Fabric | % AS | DC (S) # of Washings 0 | DC (S) # of Washings 50 | DC (D) # of Washings 0 | DC (D) # of Washings 50 |
|---|---|---|---|---|---|
| A. | 5 | 5.4 | >15** | >15 | — |
|    | 10 | 0.35 | 1.5** | 7.0 | 3.9** |
| B. | 5 | >15 | >15** | >15 | — |
|    | 10 | 4.5 | 2.7** | 9.0 | — |
| C. | 5 | 11 | — | ≧12 | 8.5* |
|    | 10 | 7.2 | 2.8 | ≧11 | 3.0 |
| D. | 5 | 2.5 | — | 14 | — |
|    | 10 | 0.35 | 1.9** | 3.7 | 2.8** |
| E. | 5 | 1.0 | 4.3* | 5.8 | — |
|    | 10 | 0.33 | 1.6* | 0.52 | — |
| F. | 5 | 2.0 | 14** | 4.2 | 8.7** |
|    | 10 | 0.48 | 4.0** | 1.6 | 11** |
| G. | 5 | >15 | >15* | >15 | 4.9 |
|    | 10 | 1.1 | 2.0 | 1.2 | 2.8 |
| H. | 7.5 | 0.50 | 1.0 | 2.3 | 0.26 |
|    | 5 | 2.5 | 1.3 | 5.0 | 0.65 |
|    | 3 | 11 | 7.0 | >15 | 2.5 |
| I. | 7.5 | .22 | ≧6 | 12 | >6 |
|    | 5 | .88 | 1.4 | 1.1 | 1.5 |
| J. | 7.5 | ≧5.3 | 4.5 | >6 | 3.7 |
|    | 5 | >10 | >6 | >6 | ≧3.5 |
| K. Tricot 40/12 dull | 0 | >15 | >15 | >15 | >15 |
| L. Luant ® T-136 40/12 ethoxylated nylon 6 | — | .52 | 1.0 | 6.7 | 2.1* |
| M. Antron ® 40-13-R25-865 semi-dull rotoset Antron-Merge 15118 | — | >15 | — | >15 | >15 |
| N. Antron ® III Sears half slip | — | 6.7 | >15 | >15 | — |
| O. Antron ® III EEG Merge 15356 (70-34-Z-288A05D) | — | 4.3 | 1.2 | 12 | 3 |
| P. Dupont 20/7 B Nylon 6,6 AIR 15354 | — | 7.3 | 6.5 | 1.5 | >15 |
| Q. Enka Comfort ® cling crepe set | — | >15 | >15 | >15 | — |
| R. Enkalure ® III 40/13 dull Type 8422 Code 828 | — | 8.6 | 5.8 | .88 | >15 |

*25 washings
**5 washings

EXAMPLE 5

Comparative Dyewashfastness

Dye washfastness of certain samples from Examples 3 and 4 is determined by measuring the total color difference of the samples (Delta E) after fifty washings. The samples are uniformly dyed with to an even dye depth

What is claimed is:

1. A compound imparting durable antistatic properties to polyamide materials and of the general formula:

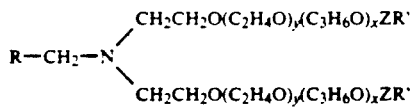

wherein R is a $C_{1-9}$ alkyl group or hydrogen, Z is a difunctional chain modifier group, R' is a $C_{1-4}$ alkyl group or hydrogen and x and y are between about 10 and about 50.

2. The compound of claim 1 wherein R is $C_{1-5}$ or hydrogen.

3. A compound for imparting durable antistatic properties to polyamide materials and of the general formula

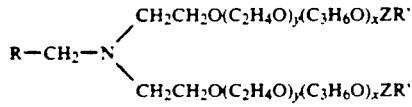

where R is a $C_{1-5}$ alkyl group or hydrogen, Z is a difunctional chain modifier group, $R^1$ is a $C_{1-4}$ alkyl group or hydrogen and x and y are each between about 20 and about 40.

4. The compound of claim 3 wherein R is a hydrogen radical.

5. The compound of claim 4 wherein Z is a $C_{2-18}$ dibasic organic acid or derivative thereof.

6. The compound of claim 4 wherein Z is azelaic acid or a derivative thereof.

7. A static resistant polymeric composition comprising:
   a polyamide; and
   an antistatic compound of the general formula:

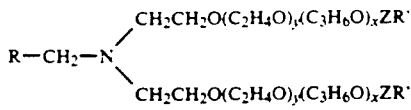

wherein R is a $C_{1-9}$ alkyl group or hydrogen, Z is a difunctional chain modifier group, R is a $C_{1-4}$ alkyl group or hydrogen and x and y are between about 10 and about 50.

8. The composition of claim 7 wherein R is $C_{1-5}$ or hydrogen.

9. The composition of claim 8 wherein x and y are each between about 20 and about 40.

10. The composition of claim 9 wherein R is a hydrogen radical.

11. The composition of claim 10 wherein Z is a $C_{2-18}$ dibasic organic acid or derivative thereof.

12. The composition of claim 11 wherein Z is azelaic acid or a derivative thereof.

13. The composition of claim 7 wherein said polyamide is nylon 6, nylon 6/T, nylon 6,6, nylon 12, copolymers and mixtures thereof.

14. The composition of claim 13 wherein said antistatic compound is about 0.5% to about 12% by weight of said polymeric material.

15. The composition of claim 14 wherein said antistatic compound is about 2% to about 6% by weight of said material.

16. A process for preparing an antistatic polyamide fiber comprising:
   a) mixing with a polyamide a compound of the general formula:

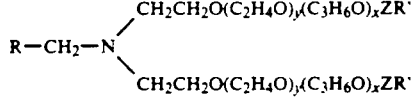

wherein R is a $C_{1-9}$ alkyl group or hydrogen, Z is a difunctional chain modifier group, R' is a $C_{1-4}$ alkyl group or hydrogen and x and y are between about 10 and about 50, the composition being added in sufficient quantity to impart antistatic properties to the resulting mixture; and
   b) extruding the resulting mixture.

* * * * *